United States Patent
Vaughan et al.

(10) Patent No.: US 6,471,938 B1
(45) Date of Patent: Oct. 29, 2002

(54) ENHANCED BORO-ALUMINOSILICATE EU-1 (LAW 962)

(75) Inventors: David Evan William Vaughan, Flemington; Karl Gottlieb Strohmaier, Port Murray, both of NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 73 days.

(21) Appl. No.: 09/615,995

(22) Filed: Jul. 14, 2000

Related U.S. Application Data

(63) Continuation-in-part of application No. 09/218,474, filed on Dec. 22, 1998, now Pat. No. 6,123,914.

(51) Int. Cl.$^7$ .......................... C01B 39/06; B01J 29/86; C10G 35/06
(52) U.S. Cl. .................. 423/700; 423/700; 423/716; 502/85; 208/135
(58) Field of Search ................ 423/700, 713, 423/716; 502/85; 208/135

(56) References Cited

U.S. PATENT DOCUMENTS

| | | | |
|---|---|---|---|
| 3,326,797 A | 6/1967 | Young | 208/111 |
| 3,374,182 A | 3/1968 | Young | 252/455 |
| 4,134,965 A | 1/1979 | Rein et al. | 423/328 |
| 4,537,754 A | 8/1985 | Casci et al. | |
| 4,767,886 A | 8/1988 | Kawamura et al. | 585/640 |
| 5,108,579 A | 4/1992 | Casci et al. | |
| 5,178,748 A * | 1/1993 | Casci et al. | |
| 5,223,240 A | 6/1993 | Roland et al. | 423/713 |
| 5,464,799 A * | 11/1995 | Casci et al. | 502/65 |
| 5,641,393 A | 6/1997 | Nakagawa | 208/46 |
| 5,945,364 A | 8/1999 | Wu et al. | 502/85 |

FOREIGN PATENT DOCUMENTS

| | | |
|---|---|---|
| EP | 0169026 | 1/1986 |
| EP | 0494535 | 7/1992 |
| FR | 2755958 | 5/1998 |

OTHER PUBLICATIONS

The Role of Diquaternary Cations as Directing Agents in Zeolite Synthesis, Zeolites 1994 vol. 14, Sep./Oct..
Structure of the Two–Dimensional Medium–Pore High––Silica Zeoliter, NU–87, vol. 353 Oct. 3, 1991, *Nature*.
Molecular Shape Selectivity of EUO Zeolite, Microporous Materials 4 (1995) 123–130.

* cited by examiner

*Primary Examiner*—David Sample
(74) *Attorney, Agent, or Firm*—Ronald D. Hantman

(57) ABSTRACT

The instant invention is directed to a process for selectively removing detrital material from boro-aluminosilicate selected from EUO, NES and intergrown mixtures of EUO and NES boro-aluminosilicate topology zeolites having a Si/M ratio of greater than about 50, comprising treating said boro-aluminosilicate with a base for a time and at a temperature sufficient to remove said detrital material from said boro-aluminosilicate wherein the concentration of said base is less than about 0.5 normal. Base concentrations in excess of this level may cause the removal of framework components leading to subsequent structural degradation.

8 Claims, 2 Drawing Sheets

N-Hexane Adsorption

ENHANCED BORO-ALUMINOSILICATE EU-1 (LAW 962)

This application is a Continuation-in-Part of U.S. Ser. No. 09/218,474 filed Dec. 22, 1998, now U.S. Pat. No. 6,123,914.

FIELD OF THE INVENTION

Applicants have discovered a process for enhancing the properties of boro-aluminosilicate EU-1 and related zeolite structures together with a catalyst based thereon having enhanced properties.

BACKGROUND OF THE INVENTION

EU-1 is a high activity aluminosilicate zeolite catalyst (U.S. Pat. No. 4,537,754) having 10-ring pores and high internal volume. It is useful as a catalyst and sorbent and shows interesting shape selectivity (U.S. Pat. No. 4,537,754; Sovererijns et al, Microporous Materials, 4, page 123 (1995)). Its compositional variations include the replacement of Al by Ga, Fe or B. As the acidity of these different metal (M) forms decreases in the order Al, Ga, Fe, B, reactions requiring the lowest acidity, such as paraffin isomerization, are probably best carried out with the borosilicate form or those materials having high Si/M ratios (i.e., lower number of acid sites). Unfortunately, when made at the higher silica ratios (those greater than about 40) some EU-1 materials have poor sorption capacity after removal of the templates normally used in its synthesis) resulting in poor accessibility of reactants and low catalytic reactivity. This may be caused by partial framework collapse (reflected in deteriorating X-ray diffraction evidence) or trapped detrital material blocking the pores (indicated by stable X-ray diffraction profiles but inferior n-hexane sorption capacities). Evidence seems to point to the latter cause in these subject materials and may be inherent to the high silica synthesis process, which requires excess silica in the mother liquor, resulting in entrainment, primarily, of siliceous species within the zeolite structure. In constrained pore systems such as EU-1, a small amount of detritus may readily block major parts of the accessible structure. Whilst it is well known that post acid treatments or chemical treatments with complexing agents may restore structural accessibility in some zeolites, including EU-1, in this case, such treatments would tend to remove the framework boron, or other M entities, responsible for the desired selective catalytic activity.

SUMMARY OF THE INVENTION

The instant invention is directed to a process for selectively removing detrital material from boro-aluminosilicate selected from EUO, NES and intergrown mixtures of EUO and NES boro-aluminosilicate topology zeolites having a Si/M ratio of greater than about 50, comprising treating said boro-aluminosilicate with a base for a time and at a temperature sufficient to remove said detrital material from said boro-aluminosilicate wherein the concentration of said base is less than about 0.5 normal. Base concentrations in excess of this level may cause the removal of framework components leading to subsequent structural degradation.

The invention is likewise especially directed to boro-aluminosilicates selected from EUO, NES and intergrown mixtures of EUO and NES boro-alumino-silicate topology specifically boro-alumino-slicate EU-1, said boro-aluminosilicate prepared by treating a boro-aluminosilicate containing detrital material with a base for a time and at a temperature sufficient to remove said detrital material from said boro-aluminosilicate wherein said boro-alumino silicate has a Si/M ratio of greater than about 50.

The above boro-alumino silicates have improved wax isomerization properties.

DETAILED DESCRIPTION OF THE INVENTION

Figure 1:
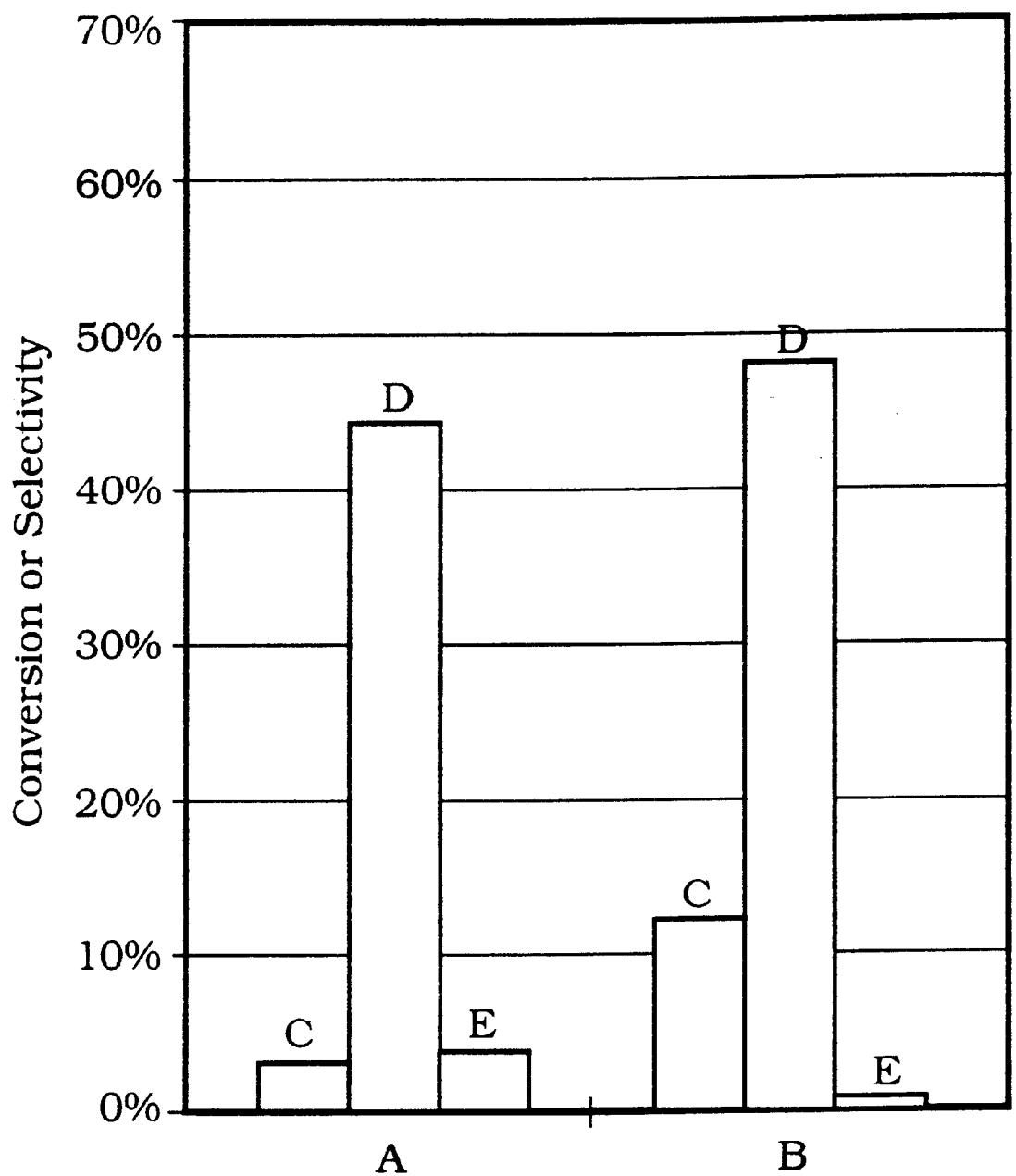
FIG. 1 shows the conversion or selectivity of examples 1 and 3. Example 1 is labeled A and Example 3 is labeled B. In the Figure, C, D, and E represent conversion, constraint or selectively; and cracking, respectively.

Applicants have discovered that mild base treatment of a boro-aluminosilicate EU- 1, frees the pores of detrital material blockages, enhances the properties, and does not destroy the structure. The so treated boro-aluminosilicate EU-1 has enhanced wax isomerization activity. Such activity is improved by a factor of at least two, and preferably at least 4. Selectivity is concomitantly improved, producing a desirable wax isomerization catalyst when compared to other framework substituted EU-1 materials.

Although boro-aluminosilicate EU-1 has a desirable selective acidity for wax isomerization, the activity is such that its use in wax isomerization processes is not practical in the as synthesized form, in the required Si/M range of greater than about 50, to yield desirable catalysts for the subject process. The instant treatment method affords boro-aluminosilicate EU-1 having a Si/M of greater than about 50 with an activity and selectivity suitable for wax isomerization processes.

Applicants believe that the mild base treatment of the instant invention removes detrital material, such as silica, from the boro-aluminosilicate EU-1 channels without destroying the structure of the boro-aluminosilicate EU-1.

The bases utilizable in the instant invention are any bases of Groups I and IIA of the Periodic Table. For example, NaOH, KOH, $Ca(OH)_2$, $Sr(OH)_2$, LiOH, RbOH, CsOH, etc. Other bases are also utilizable and are easily selected by the skilled artisan. The base utilized will have a concentration of less than about 0.5 normal, preferably from about 0.1 to about 0.5 normal, and most preferably from about 0.1 to about 0.4 N.

The time and temperature for the base treatment are those under which the detrital material is removed. Typically, temperatures of about room temperature for several hours (e.g., overnight) up to reflux (~100° C.) for less than one hour are utilized. Whilst it is recognized that lower temperatures and longer times, or higher temperatures (and therefore pressures over one atmosphere) and shorter times, are also functional, the increased cost of such temperature reactions make them economically undesirable. Similarly, although solvents other than water for the bases (particularly polar organic solvents) are acceptable (e.g., alcohols, ketones, ethers, etc.), their cost, safety, pollution and process concerns render them less desirable. Higher temperature treatments also require more control to prevent structural destruction in the zeolite.

Though the instant invention is primarily directed to EU-1 boro-aluminosilicates, since NU-85, NU-86, and NU-87 are related structures topologically or by intergrowths (i.e., structure types EUO, NES and intergrowths and mixtures of the two, as described in 4th Edn. of the "Atlas of zeolite structure types", Ed. Meier, Olson and Baerlocher, Elsevier (1996)), the instant process should be equally applicable to them. Such structures are well documented in the literature. See for example, NU-85 (Euro. Pat. Application 0462 745), NU-86 (U.S. Pat. No. 5,108,579), NU-87 (U.S. Pat. No. 5,102,641; Shanon et al, Nature, v. 353, p. 417 (1991)), and ZSM-50 (U.S. Pat. No. 4,640,829; Moini et al, Zeolites, v. 14, p. 504 (1994) herein incorporated by reference). Boro-gallosilicate analogs are similarly acceptable. Preferably, the NU-87 zeolite will be used.

Typical preferred treatment times range from about 5 minutes to about 4 hours.

The zeolites treated in accordance with the instant invention can be utilized in a catalytic isomerization process conducted under catalytic isomerization conditions. Typical conditions include those well known to the skilled artisan. For example, the process is carried out in the presence of hydrogen at temperatures of about 200 to 450° C. and pressures ranging from atmospheric to about 3000 pounds.

The following examples are illustrative and are not meant to be limiting in any way.

EXAMPLE 1

A sample of B-EU-1 obtained from the IFP company was evaluated. The chemical analysis of this is shown in Table 1. 7B-MASNMR of this material showed a single peak at 4.7 ppm indicative of tetrahedra framework boron. This sample was measured for n-hexane sorption capacity and catalytic activity (FIG. 1) using methylcyclohexane as a model compound. Samples were made into catalysts by impregnating with 0.5 wt % Pt from $Pt(NH_3)_4Cl_2$ solutions, calcined, pilled then crushed to 10/20 mesh granules before testing in a standard acidity test using methylcyclohexane (MCH) as a model feed ($H_2$/feed=5/ MCH=20 ml/hr/200 psig $H_2$). This test has proved to be useful in selecting desirable zeolite wax isomerization catalysts. A desirable catalyst has a high isomerization selectivity to ethylcyclopentane (ECP) with low cracking activity. The data shown in FIG. 1 (obtained at 320° C.) shows good selectivity but very poor activity. Surprisingly, the sorption capacity was negligible compared to similar, but less desirable from a catalytic viewpoint, gallo- and ferri-aluminosilicate analogs of the original base aluminosilicate EU-1. The good crystallinity but poor sorption capacity indicated structural blockage.

EXAMPLE 2

Figure 2:
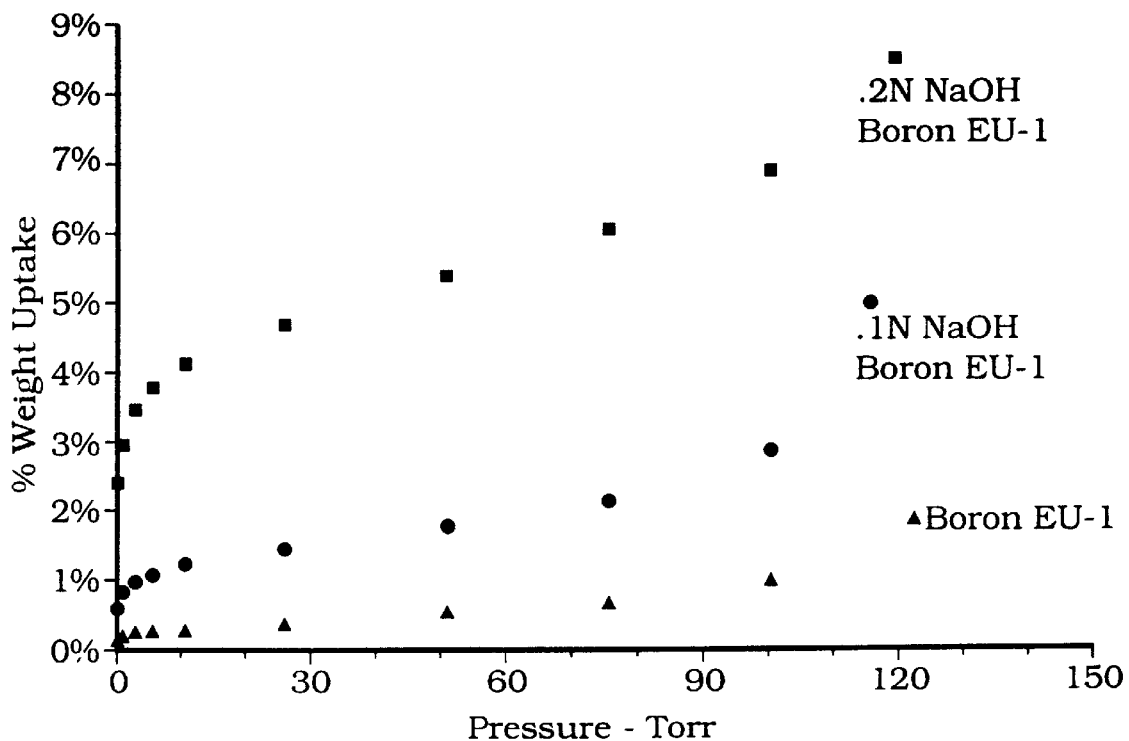
FIG. 2 depicts the n-hexane adsorption isotherm measured at room temperature. The % weight uptake is plotted against pressure (torr) for boro-aluminosilicate EU-1 (triangles), .1 N NaOH treated boro-aluminosilicate EU-1 (circles), and 0.2 N NaOH treated boro-aluminosilicate EU-1 (squares).

A 1 gram sample of the EU-1 described in Example 1 was reacted with 20 ml of a 0.1N NaOH solution at 60° C. for one hour. After filtering, washing and drying the sample was evaluated by X-ray diffraction, activated under vacuum on a Cahn sorption balance, then cooled to room temperature and an n-hexane sorption isotherm measured. The X-ray structure is unchanged by the base treatment, but shows improved sorption capacity compared to the base material (FIG. 2).

EXAMPLE 3

The process of Example 2 was repeated except that the base concentration was increased to 0.2 N NaOH. The X-ray structure was unchanged by the treatment and a major improvement in sorption capacity (FIG. 2) was observed. A larger sample was given a repeated treatment then exchanged with 10% wt. ammonium chloride solution (4 gm/40 ml/50° C./1 hr) and was analyzed for constituent elements by ICPAES (Table 1), showing that silica was removed. This material was converted to a catalyst by impregnation with 0.5% wt. Pt (as $Pt(NH_3)_4Cl_2$) and reacted under the conditions described in Example 1, the activity of B-EU-1 improves by a factor of four and selectivity is improved. Chemical analysis of this sample (Table 1) showed silica depletion, indicative of detrital silica removal.

EXAMPLE 4

The process of Example 2 was repeated except that the base concentration was increased to 0.5N NaOH. The X-ray diffraction indicated that the structure suffered major degradation by the treatment confirmed by a decrease in sorption capacity compared to Example 3.

EXAMPLE 5

A sample of aluminosilicate EU-1, having an Si/Al ratio of 194, was evaluated on a Cahn sorption balance with n-hexane, giving a sorption capacity of 0.63 wt % (22° C./51 torr). After the base treatment described in Example 3, the n-hexane sorption capacity increased to 4.2 wt %, again indicative of detrital material removal from the pore space.

The Examples show that a mild base treatment is sufficient to clean up the blocked EU-1 structure to improve catalytic activity by the removal of detrital material, primarily silica, from the channels of the zeolite without significant removal of B (or Al) from the framework, so retaining catalytic activity and selectivity.

TABLE I

CHEMICAL ANALYSIS OF B-EU-1 SAMPLES

| Sample | % B | % Al | % Si | % Na | B:Al:Si Atomic Ratio |
|---|---|---|---|---|---|
| Example 1 | 0.12 | 0.12 | 44.0 | 0.06 | 1:0.40:141 |
| Example 3 | 0.11 | 0.19 | 43.0 | 0.02 | 1:0.68:150 |

EXAMPLE 6

Several samples were prepared in accordance with the teachings of U.S. Pat. No. 4,537,751 with the following results.

TABLE 2

TABLE OF ABSORPTION DATA ON BU-1 MATERIALS MEASURED AT 50 TORR N-HEXANE VAPOR PRESSURE AND 22° C.

| Sample | Si/(Al + B) | n-$C_6$ Absorption |
|---|---|---|
| Al EU-1 | 16 | 9.1% |
| Al EU-1 | 27 | 9.5% |
| Al EU-1 | 38 | 9.3% |
| Al EU-1 | 75 | 3.3% |
| BEU-1 | 101 | 0.5% |
| Al EU-1 | 194 | 0.6% |

The table shows that prior art methods for preparing EU-1 materials having high Si/(Al+B) ratios result in compositions with unfavorable n-$C_6$ absorption.

What is claimed is:

1. A boro-aluminosilicate composition selected from EU1 and intergrown mixtures of EU1 and NES boro-aluminosilicate topology zeolites, said boro-aluminosilicate composition prepared by treating a boro-aluminosilicate containing detrital material with a base for a time and at a temperature sufficient to remove said detrital material from said boro-aluminosilicate composition wherein said boro-aluminosilicate composition has a Si/M ratio of >about 50.

2. The composition of claim 1 wherein said composition has improved wax isomerization properties.

3. A boro-aluminosilicate according to claim 2 wherein said improved wax isomerization properties include an activity improved by a factor of at least two and an improved selectivity.

4. The composition of claim 1 wherein said base has a concentration of about 0.5 normal or less.

5. The composition of claim 1 wherein said base has a concentration of about from 0.1N to about 0.4N.

6. The composition of claim 1 wherein said base is selected from the group consisting of LiOH, NaOH, KOH, RbOH, CsOH, $Ca(OH)_2$, $Sr(OH)_2$, $Ba(OH)_2$ and mixtures thereof.

7. The composition of claim 1 wherein said NES topology boro-aluminosilicate zeolite is selected from the group of NU-85, NU-86, and NU-87 zeolites and mixtures thereof.

8. A catalytic isomerization process comprising contacting a feedstock comprising a $C_{16}$ to $C_{46}$ carbon containing feedstock under catalytic isomerization conditions with a catalyst comprising the boro-aluminosilicate zeolite of claim 1.

* * * * *